(12) United States Patent
Kucab

(10) Patent No.: US 10,843,672 B2
(45) Date of Patent: Nov. 24, 2020

(54) HYBRID VEHICLE ENGINE BRAKE WITH MANUAL OVERRIDE

(71) Applicant: Ford Global Technologies, LLC, Dearborn, MI (US)

(72) Inventor: Gregory Kucab, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 51 days.

(21) Appl. No.: 16/380,130

(22) Filed: Apr. 10, 2019

(65) Prior Publication Data

US 2020/0324750 A1    Oct. 15, 2020

(51) Int. Cl.
| | |
|---|---|
| *B60T 11/10* | (2006.01) |
| *B60T 15/04* | (2006.01) |
| *F16D 27/09* | (2006.01) |
| *F16D 41/12* | (2006.01) |
| *B60T 13/74* | (2006.01) |
| *B60K 6/36* | (2007.10) |
| *B60K 6/387* | (2007.10) |

(52) U.S. Cl.
CPC ........... *B60T 11/105* (2013.01); *B60T 13/746* (2013.01); *B60T 15/041* (2013.01); *F16D 27/09* (2013.01); *F16D 41/12* (2013.01); *B60K 6/36* (2013.01); *B60K 6/387* (2013.01)

(58) Field of Classification Search
None
See application file for complete search history.

(56) References Cited

U.S. PATENT DOCUMENTS

| | | | |
|---|---|---|---|
| 6,517,464 B2 | 2/2003 | Yamazaki et al. | |
| 7,597,648 B2 | 10/2009 | Conlon et al. | |
| 8,465,387 B2 | 6/2013 | Conlon | |
| 9,546,729 B2 | 1/2017 | Bird et al. | |
| 9,732,809 B2 | 8/2017 | Niemiec et al. | |
| 10,023,203 B2 | 7/2018 | Iida et al. | |
| 10,024,370 B1 | 7/2018 | Klaser et al. | |
| 2009/0288895 A1* | 11/2009 | Klemen | B60W 10/06 180/65.25 |
| 2015/0343890 A1 | 12/2015 | Ortmann et al. | |
| 2016/0272195 A1* | 9/2016 | Hirasawa | B60K 6/365 |
| 2016/0356323 A1* | 12/2016 | Endo | B60K 6/30 |
| 2017/0204917 A1 | 7/2017 | Bird et al. | |
| 2018/0119806 A1 | 5/2018 | Armstead et al. | |

FOREIGN PATENT DOCUMENTS

WO    2018152617 A1    8/2018

\* cited by examiner

*Primary Examiner* — Mark A Manley
(74) *Attorney, Agent, or Firm* — David Kelley; Brooks Kushman P.C.

(57) ABSTRACT

A power split hybrid powertrain includes an electrically actuated brake that selectively engages a ring gear attached to a flywheel. The ring gear may be, for example, a starter ring gear. Engagement of the brake while the engine is stopped permits use of both electric machines to provide torque to vehicle wheels, thereby increasing the electric torque capacity of the powertrain. The brake is mounted for movement relative to the ring gear, and a mechanical linkage is attached to the brake. In the event of a malfunction of the brake that prevents normal operation of the powertrain, the linkage is manually actuatable by a vehicle operator to move the brake to an override position wherein it cannot engage the ring gear.

20 Claims, 5 Drawing Sheets

HYBRID VEHICLE ENGINE BRAKE WITH MANUAL OVERRIDE

TECHNICAL FIELD

This disclosure relates to the field of hybrid vehicles. More particularly, the disclosure pertains to a mechanical override mechanism for disengaging a failed engine brake of a hybrid vehicle.

BACKGROUND

Many vehicles are used over a wide range of vehicle speeds, including both forward and reverse movement. Internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later to power one or more electric machines associated with the transmission, allowing the engine to produce less power than instantaneously required for propulsion and thereby consuming less fuel.

During some operating modes of a hybrid electric powertrain, it may be desired to lock an output shaft of the stopped engine to prevent rotation. Locking of the shaft may be necessary to provide a reaction torque for an electric machine which allows the machine to provide torque to the transmission. Locking of the engine output shaft (which may equivalently be described as locking of the transmission input shaft) may be achieved by an electrically activated engine brake. Such a brake is disclosed in U.S. patent application Ser. No. 16/195,122 the disclosure of which is incorporated herein by reference.

SUMMARY OF THE DISCLOSURE

A powertrain for a hybrid-electric vehicle includes a ring gear attached to a flywheel driven by an internal combustion engine, a selectively engagable engine brake having an electric actuator moving a pawl between a first position engaged with the ring gear to prevent rotation thereof in at least one direction and a second position disengaged from the ring gear to allow rotation thereof in the at least one direction, and a mechanical linkage configured to be manually actuated by a vehicle occupant to move the engine brake away from the ring gear and prevent engagement of the pawl with the ring gear. The electric actuator may be a solenoid having a pin that when powered (supplied with electric current) urges the pawl to the first position. A lever may be connected with an end of the mechanical linkage distal from the engine brake, the lever movable by the vehicle occupant to actuate the mechanical linkage. The lever may be disposed in a passenger compartment of the vehicle. The mechanical linkage may be a Bowden cable. The engine brake may be movably retained in a bracket movably retaining the engine brake, actuation of the mechanical linkage moving the engine brake relative to the bracket.

Apparatus for a hybrid-electric vehicle powertrain includes a selectively engageable engine brake mounted for movement relative to an engine output shaft between a) an operating position in which the engine brake is actuatable to alternatively prevent and allow rotation of the engine output shaft in at least one direction, and b) an override position in which the engine brake cannot be actuated to prevent rotation of the engine output shaft in the at least one direction. A mechanical linkage is attached to the engine brake and is configured and operative to be manually actuated by a vehicle occupant to move the engine brake from the operating position to the override position. A gear may be coupled to the engine output shaft, the engine brake having a pawl engageable with the gear to prevent rotation of the output shaft when the engine brake is in the operating position. The gear may be a ring gear attached to a flywheel coupled to an engine crankshaft. The engine brake may include a solenoid that when powered prevents rotation of the engine output shaft in the at least one direction. The solenoid may be energized to hold a pawl in engagement the gear coupled with the engine output shaft. A lever may be connected with an end of the mechanical linkage distal from the engine brake, the lever movable by the vehicle occupant to actuate the mechanical linkage. The lever may be disposed in a passenger compartment of the vehicle. The mechanical linkage may be a Bowden cable. A bracket may movably retain the engine brake, such that actuation of the mechanical linkage moves the engine brake relative to the bracket.

A powertrain for a hybrid-electric vehicle includes a gear coupled to a transmission input shaft driven by an internal combustion engine, an engine brake mounted for movement between an operating position wherein it is electrically actuatable between a first condition engaging the gear to prevent rotation of the gear in a first direction and a second condition disengaged from the gear to allow rotation of the gear in the first direction, and an override actuatable by a vehicle occupant to move the engine brake from the operating position to an override position wherein the engine brake is disengaged from the gear in the first condition. The engine brake may include a solenoid operative when powered to hold a pawl in engagement with the gear. The gear may be a ring gear attached to a flywheel coupled to a crankshaft of the engine. A bracket may movably retain the engine brake such that actuation of the override moves the engine brake relative to the bracket. The override may comprise a Bowden cable coupled with the engine brake, such that when tension is applied to the Bowden cable the engine brake is moved to the override position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to have the same rotational speed about the same axis in all operating conditions. Rotating elements can be fixedly coupled by, for example, spline connections, welding, press fitting, or machining from a common solid. Slight variations in rotational displacement between fixedly coupled elements can occur such as displacement due to lash or shaft compliance. In contrast, two rotating elements are selectively coupled by a shift element when the shift element constrains them to have the same rotational speed about the same axis whenever the shift element is fully engaged and the elements are free to have distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
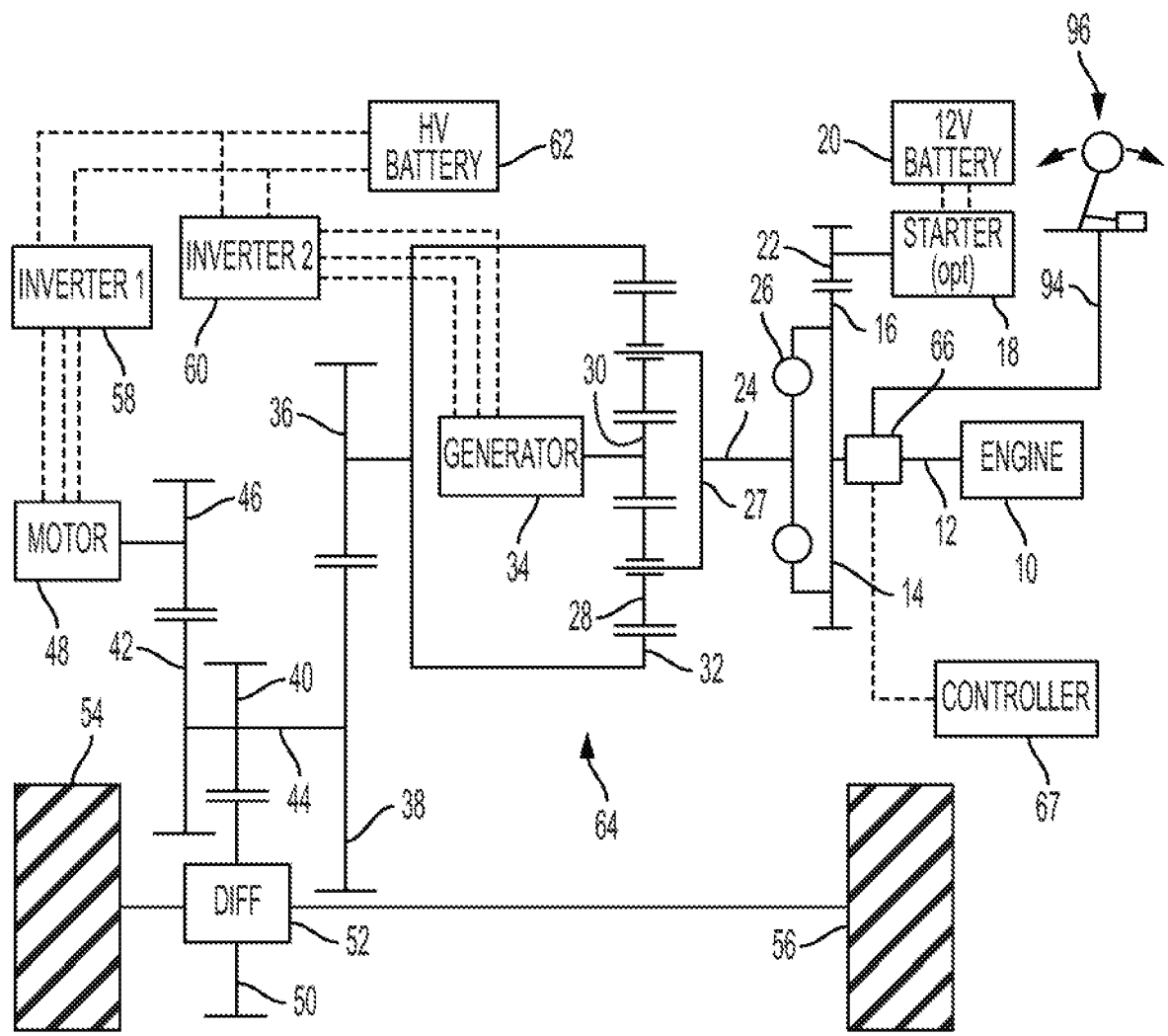
FIG. 1 is a schematic diagram of a hybrid electric powertrain.

FIG. 1 schematically illustrates a kinematic arrangement for a power-split type hybrid electric vehicle. Power is provided by an internal combustion engine 10 which drives an engine output shaft 12, alternatively referred to in art as a crankshaft. Crankshaft 12 is fixedly coupled to flywheel 14. The inertia of the flywheel 14 helps to reduce rotational speed variation due to the firing pulses typically produced by an internal combustion engine. A ring gear 16 is fixed to the outer periphery of flywheel 14. In some embodiments, a starter 18 driven by low voltage battery 20 may drive a pinion gear 22. To start the engine 10, pinon gear 22 is moved into engagement with ring gear 16 and then powered is provided to starter 18 to bring the engine up to a speed at which combustion can be sustained. Once the engine 10 is started, the pinion gear 22 is typically disengaged from the ring gear 16 to avoid subjecting the starter motor 18 to high engine speeds. As will be discussed later, other components are also capable of starting the engine 10, so the starter motor 18 may not be present in all embodiments. Transmission input shaft 24 is driven by flywheel 14 via torsional isolator 26 which further shields the transmission from engine torque pulses. The flywheel and torsional isolator are commonly located outside of the sealed transmission case. They may be fully or partially enclosed by a component referred to as a bell housing.

Transmission input shaft 24 is fixedly coupled to planet carrier 27. A set of planet gears 28 are supported for rotation with respect to carrier 27. Sun gear 30 and ring gear 32 are each supported for rotation about the same axis as carrier 27 and each mesh with the planet gears 28. Generator 34 is fixedly coupled to sun gear 30. Layshaft gear 36 is fixedly coupled to ring gear 32 and meshes with layshaft gear 38. Layshaft gear 38 is fixedly coupled to layshaft gears 40 and 42 via shaft 44. Layshaft gear 46 meshes with layshaft gear 42 and is fixedly couple to motor 48. Layshaft gear 40 meshes with layshaft gear 50 which is the input to differential 52. Differential 52 drives wheels 54 and 56 allowing slight speed differences as the vehicle turns a corner.

Generator 34 and motor 48 are both reversible electric machines, meaning that they are capable of converting electrical power to mechanical power or converting mechanical power to electrical power. In this example, each machine is a synchronous Alternating Current (AC) motor. Motor 48 is powered by inverter 58. Similarly, generator 34 is powered by inverter 60. Both inverters are electrically connected to high voltage battery 62.

The planetary gear set, differential 52, generator 34, motor 48, and layshaft gearing among these components are typically referred to as a transmission or transaxle 64. These components are typically contained within a housing called a transmission case 72 (see FIG. 2). The inverters 58 and 60 are typically mounted to the outside of the transmission case but may be mounted remotely. Transmission input shaft 24 and the two half-shafts (coupled with wheels 54, 56) penetrate the transmission case.

In some circumstances, engine 10 may generate more power than is delivered to the vehicle wheels 54 and 56 with the excess power stored in battery 62. In other circumstances, power may flow from battery 62 permitting engine 10 to produce less power than the instantaneous demand of the vehicle. For example, the engine 10 may be off while power to propel the vehicles comes from battery 62. During braking maneuvers, motor 48 may exert negative torque, thus producing electrical energy that is stored in battery 62 to reduce future use of engine 10. Use of motor 48 to provide braking in this manner is called regenerative braking.

The engine may be started without using starter 18 by using generator 34. As long as there is a reaction torque at ring gear 32, torque produced by generator 34 will tend to rotate the engine crankshaft. The reaction torque at ring gear 32 may be provided by motor 48, a parking brake, the inertia of the vehicle, or by placing the transmission in a PARK mode that locks the transmission output shaft.

The total torque exerted on the vehicle wheels is a function of the torque exerted by motor 48, the torque exerted by generator 34, and the torque exerted on the transmission input shaft 24. Torque generated by motor 48 is transmitted at a fixed ratio to the wheels, with the ratio dictated by the tooth numbers of gears 46, 42, 40, and 50. Torque applied to ring gear 32 is also transmitted at a fixed ratio to the wheels, with the ratio determined by tooth number of gears 36, 38, 40, and 50. The torque exerted on ring gear 32 is proportional to the torque exerted on sun gear 30 and on carrier 27. In most operating conditions, the torque exerted on sun gear 30 is generated by generator 34 and the torque exerted on carrier 27 is generated by engine 10.

However, when the engine is off, the torque that it exerts on carrier 27 is limited to engine friction, which is orders of magnitude less than the torque capacity when the engine is running. Therefore, generator 34 is not capable of contributing significant wheel torque when the engine is off unless the engine crankshaft 12 is locked against rotation such that it may provide a reaction torque for the generator. An engine brake 66 operative to selectively lock the crankshaft 12 against rotation is shown schematically in FIG. 1. The engine brake 66 is selectively actuated between a engaged (brake ON) condition and a disengaged (brake OFF) condition as commanded by a controller 67.

Figure 2:
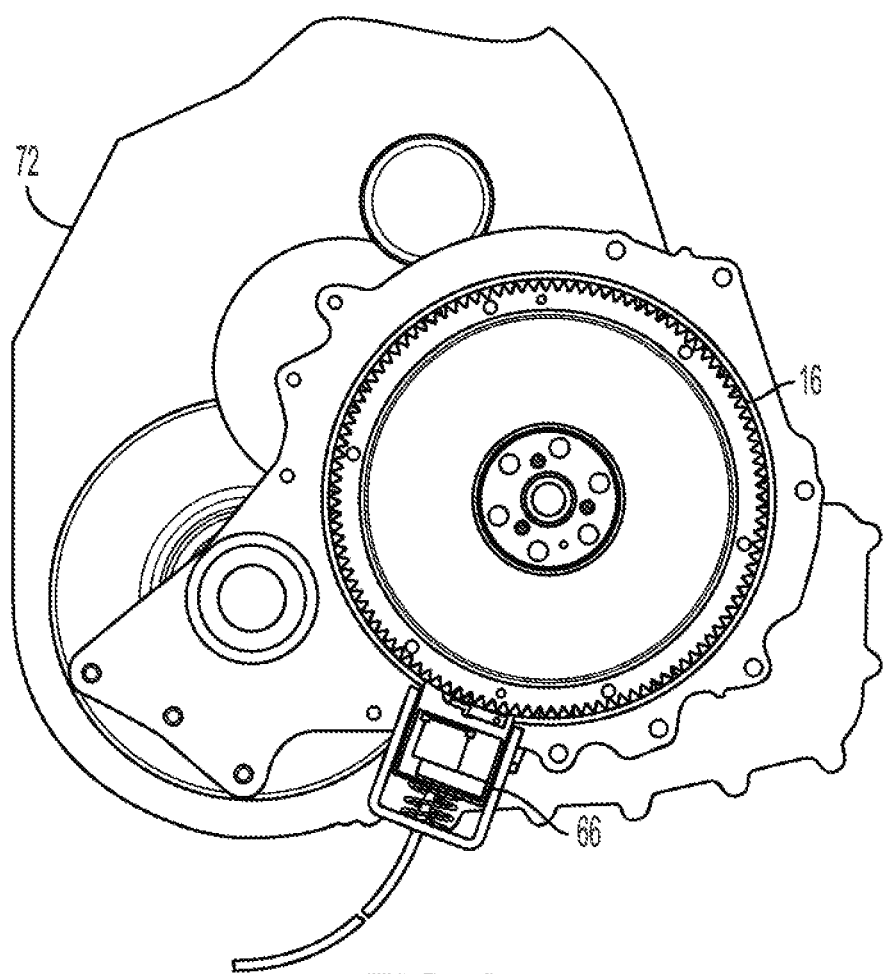
FIG. 2 is an end view of a transmission and flywheel showing a possible position or an engine brake.

As disclosed in co-pending U.S. patent application Ser. No. 16/195,122 (the disclosure of which is incorporated herein by reference), the engine brake 66 may be operative to engage ring gear 16 when it is necessary brake or lock the engine, and may be disengaged from the ring gear to allow the engine to run. FIG. 2 illustrates a potential location of an electro-magnetically actuated engine brake 66. The brake mechanism and the selective actuation mechanism are mounted externally to transmission case 72 and may be enclosed by a bell housing (not shown). When actuated to its engaged condition, the brake engages ring gear 16 to hold crankshaft 12, transmission input shaft 24, and carrier 27 against rotation when the engine is stopped so that the engine may provide a reaction torque. When actuated to its disengaged condition, the engine brake releases the ring gear so that the engine may be started and operate normally.

It is possible for the disclosed engine brake to malfunction or fail in a way that may adversely affect the operation of the vehicle in which it is installed. For example, if the engine brake operates as a "reverse one-way clutch" to prevent crankshaft rotation in the Forward direction (the normal direction of rotation when the engine is operating), the brake must be disengaged in order for the engine to be started and operate normally. If the engine brake fails to the engaged condition so that it cannot be actuated to its disengaged condition, it will prevent the engine from starting. It is also possible for an engine brake to operate as a "forward one-way clutch" to prevent crankshaft rotation opposite to the engine's operating rotation direction, thereby providing reaction torque that allows the generator 34 to power the vehicle in reverse. If this type of engine brake fails to the engaged condition so that it cannot be actuated to its disengaged condition, it will cause undesirable noise and vibration (a "ratcheting") when the engine runs.

If an engine brake of either type described above (forward or reverse one-way clutch) fails to the disengaged condition and cannot be actuated to the engaged condition in which it locks the crankshaft, then the engine can still start and run, but the generator 34 (when operating as a motor) is unable to effectively deliver torque to drive the vehicle wheels.

Figure 3:
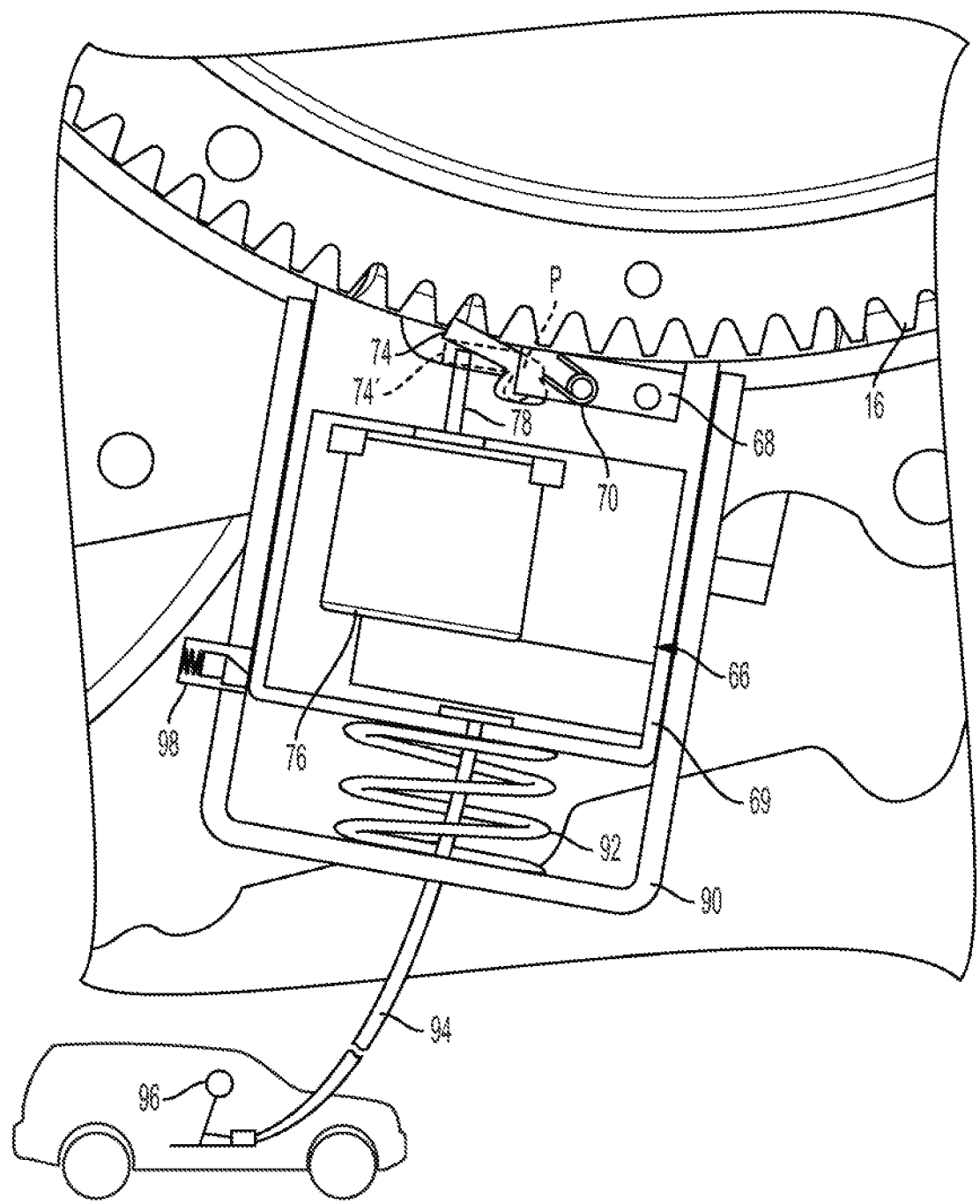
FIG. 3 is an end view of an engine brake with an override in an operating position.

FIG. 3 illustrates an engine brake 66 comprising a casing 69 to which a retainer 68 and an electrically-powered actuator such as a solenoid 76 are mounted. A pawl 74 is pivotably supported by retainer 68 and is able to rotate relative thereto about a pivot axis P. When solenoid 76 is supplied with electric current, the resulting electromotive force urges a movable pin 78 to the extended position wherein it urges the pawl 74 upwardly/clockwise to the engaged position shown in FIG. 3 wherein the pawl engages ring gear 16 to prevent the ring gear from rotating in the counter-clockwise direction.

Clockwise rotation of ring gear 16 may cause pawl 74 to pivot against the force of the solenoid such that clockwise rotation of ring gear 16 is not prevented. When current is removed from solenoid 76, a spring 70 (schematically shown as a torsion spring) acting on the pawl 74 and/or the solenoid pin 78 and/or gravity causes pawl 74 to pivot downward/counterclockwise about its pivot axis P to the disengaged position (indicated in broken lines in FIG. 3) wherein the pawl is out of engagement with ring gear 16, freeing ring gear 16 to rotate in either direction.

Other embodiments of an engine brake are disclosed in U.S. patent application Ser. No. 16/195,122, the disclosure of which is hereby incorporated by reference.

The engine brake is equipped with an override. A bracket 90 is fixedly mounted to non-rotating structure adjacent to the ring gear 16 and is substantially open at an upper end immediately adjacent to the gear. Engine brake 66 is retained in the bracket 90 and is movable linearly relative thereto toward and away from the ring gear 16. A spring, schematically indicated as a coil spring 92, is located between an inner lower surface of the bracket 90 and the casing 69 to bias or urge the engine brake 66 generally radially inward toward the ring gear 16. This inwardly-biased position of the brake 66 is defined as the operating position, in which the pawl 74 is actuatable between the engaged and disengaged conditions relative to the ring gear 16, and thus the brake is fully functional.

Figure 4:
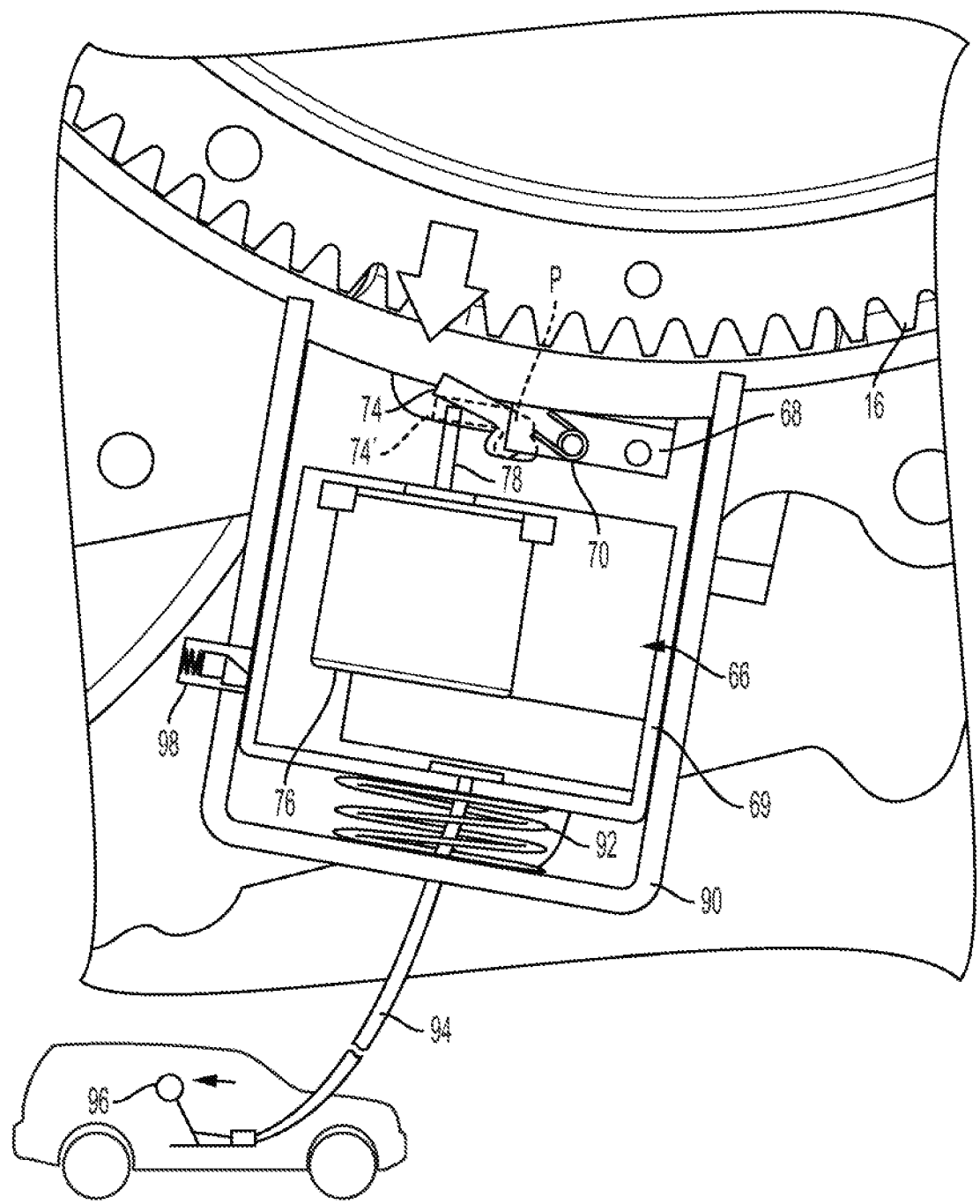
FIG. 4 is an end view of the flywheel brake with the override in an override position.

In the event that a failure or malfunction of the engine brake 66 makes it necessary or desirable to prevent the brake from engaging the crankshaft, a manual override is provided. The override comprises a mechanical linkage 94 that is physically connected to the brake casing 69 and is actuatable by a vehicle occupant or operator from a location remote from the brake and easily assessable to the occupant/operator, for example from within the vehicle passenger compartment. Mechanical linkage 94 may for example be a Bowden cable, but any appropriate type of flexible or rigid linkage may be used. As indicated schematically in FIG. 3, an opposite end of the linkage 94 may be connected to a lever 96 located remotely from the engine and transmission Actuation of the mechanical linkage 94 draws the engine brake 66 radially outward relative to the ring gear 16 so that the brake moves from the operative position shown in FIG. 3 to the override position shown in FIG. 4. This actuation moves the engine brake 66 downward (as viewed in FIG. 3) within the bracket 90 against the force of the spring 92. A latch 98 may be provided on the bracket 90 that engages the casing 69 and retains the brake 66 in the override position after tension on the linkage is released. The override linkage 94 may be actuated by the vehicle operator/occupant moving the lever 96 as indicated schematically in FIG. 4. The lever 96 may advantageously be located in the passenger compartment of the vehicle, preferably at a hidden or protected location to prevent inadvertent actuation. The lever 96 may, however, be located at any location in or on the vehicle that can be accessed by an operator, such as in the engine compartment.

In the override position, the pawl 74 is physically prevented from engaging the teeth of the ring gear 16. In the illustrated embodiment, rotation of pawl 74 about pivot axis P is physically limited such that it cannot rotate in the clockwise direction beyond the position shown in FIG. 4. In the override position, the engine brake 66 is unable to contact the ring gear 16 in a manner to either restrict rotation or to produce a ratcheting-type noise/vibration.

In a preferred embodiment, a failure of the engine brake is automatically detected by software associated with controller 67 (or with other electronic devices associated with the engine and/or transmission). Upon this automatic detection, an alert is generated to notify (visually, audibly, etc.) the vehicle operator to the malfunction. In conjunction with the alert, instructions may be provided (on a driver information display, for example) as to how to locate and actuate the override mechanism, and/or the operator may be directed to refer to an Operator's Manual supplied with the vehicle.

Figure 5:
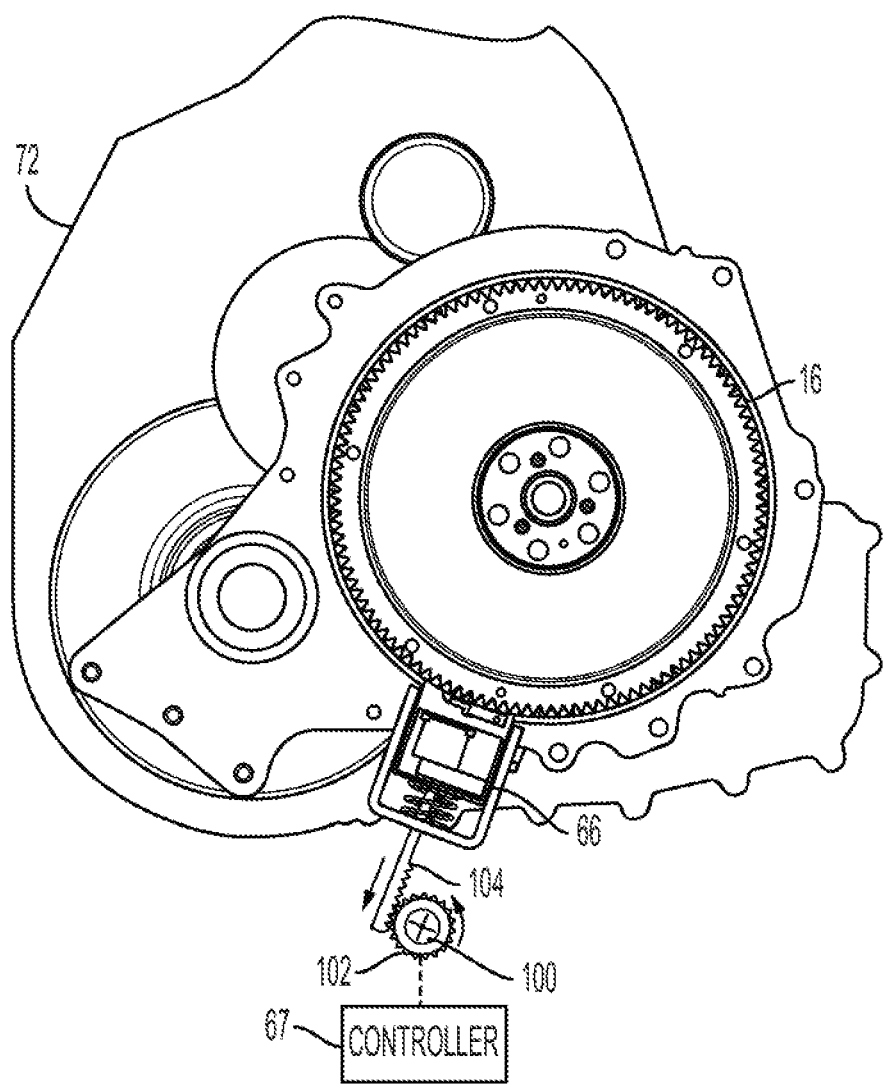
FIG. 5 shows an alternative embodiment of an engine brake override mechanism employing an electro-mechanical actuator to move the brake from the operating position and the override position.

In another embodiment, the engine brake 66 may be moved to the override position by an electro-mechanical actuator instead of being manually actuated. For example, FIG. 5 schematically depicts an electrical motor 100, such as a stepper motor, driving a pinion gear 102 that engages a rack 104. The rack 104 is connected with the engine brake 66 such that rotation of the pinion gear draws the brake to the override position. Alternatively, the electro-mechanical actuator may be a solenoid or other linear actuator. The electro-mechanical device 100 may be activated automatically (with no operator input) in response to detection of a failure of the engine brake (by software associated with controller 67 or with other electronic devices associated with the engine and/or transmission, as disclosed above) to move the engine brake 66 to the override position. Automatic actuation to the override position may be accompanied by a driver alert to have the vehicle serviced as soon as practical.

Failures of the engine brakes that may require use of the override feature described above may include a malfunction (electrical and/or mechanical) of the solenoid resulting in it seizing in the engaged condition, or the retainer spring 70 failing to retract the pawl from engagement with the ring gear.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A powertrain for a hybrid-electric vehicle comprising:
a ring gear attached to a flywheel driven by an internal combustion engine;
a selectively engagable engine brake having an electric actuator moving a pawl between a first position engaged with the ring gear to prevent rotation thereof in at least one direction and a second position disengaged from the ring gear to allow rotation thereof in the at least one direction; and
a second actuator operative to move the engine brake away from the ring gear and prevent engagement of the pawl with the ring gear.

2. The powertrain of claim 1, wherein the second actuator comprises a mechanical linkage configured to be manually actuated by a vehicle occupant.

3. The powertrain of claim 2, further comprising a lever connected with an end of the mechanical linkage distal from the engine brake, the lever movable by the vehicle occupant to actuate the mechanical linkage.

4. The powertrain of claim 3, wherein the lever is disposed in a passenger compartment of the vehicle.

5. The powertrain of claim 2 wherein the mechanical linkage is a Bowden cable.

6. The powertrain of claim 1, further comprising a bracket movably retaining the engine brake, actuation of the second actuator moving the engine brake relative to the bracket.

7. The powertrain of claim 1, wherein the second actuator is an electro-mechanical actuator.

8. Apparatus comprising:
a selectively engageable engine brake mountable for movement relative to an engine output shaft between a) an operating position in which the engine brake is actuatable to alternatively prevent and allow rotation of the engine output shaft in at least one direction, and b) an override position in which the engine brake cannot be actuated to prevent rotation of the engine output shaft in the at least one direction; and
a mechanical linkage configured to be manually actuated by a vehicle occupant to move the engine brake from the operating position to the override position.

9. The apparatus of claim 8, further comprising a gear coupled to the engine output shaft, and wherein the engine brake comprises a pawl engageable with the gear to prevent rotation of the output shaft when the engine brake is in the operating position.

10. The apparatus of claim 9, wherein the gear is a ring gear attached to a flywheel coupled to an engine crankshaft.

11. The apparatus of claim 8, wherein the engine brake comprises a solenoid that when powered prevents rotation of the engine output shaft in the at least one direction.

12. The apparatus of claim 8, further comprising a lever connected with an end of the mechanical linkage distal from the engine brake, the lever movable by the vehicle occupant to actuate the mechanical linkage.

13. The apparatus of claim 12, wherein the lever is disposed in a passenger compartment of the vehicle.

14. The apparatus of claim 8, further comprising a bracket movably retaining the engine brake, actuation of the mechanical linkage moving the engine brake relative to the bracket.

15. A powertrain for a hybrid-electric vehicle comprising:
a gear coupled to a transmission input shaft, the input shaft driven by an internal combustion engine;
an engine brake mounted for movement between an operating position wherein it is electrically actuatable between a first condition engaging the gear to prevent rotation of the gear in a first direction and a second condition disengaged from the gear to allow rotation of the gear in the first direction; and
an override actuatable by a vehicle occupant to move the engine brake from the operating position to an override position wherein the engine brake is disengaged from the gear in the first condition.

16. The powertrain of claim 15, wherein the engine brake comprises a solenoid operative when powered to hold a pawl in engagement with the gear.

17. The powertrain of claim 15, wherein the gear is a ring gear attached to a flywheel coupled to a crankshaft of the engine.

18. The powertrain of claim 15, further comprising a bracket movably retaining the engine brake, actuation of the override moving the engine brake relative to the bracket.

19. The powertrain of claim 15, wherein the override comprises a Bowden cable coupled with the engine brake, the Bowden cable tensionable to move the engine brake to the override position.

20. The powertrain of claim 15, wherein the override comprises an electro-mechanical actuator.

* * * * *